US007022361B2

(12) United States Patent
Roth

(10) Patent No.: US 7,022,361 B2
(45) Date of Patent: Apr. 4, 2006

(54) METHOD FOR MODIFYING PH WITHIN MEAT PRODUCTS

(75) Inventor: Eldon Roth, Dakota Dunes, SD (US)

(73) Assignee: Freezing Machines, Inc., Dakota Dunes, SD (US)

(*) Notice: Subject to any disclaimer, the term of this patent is extended or adjusted under 35 U.S.C. 154(b) by 94 days.

(21) Appl. No.: 10/379,761

(22) Filed: Mar. 5, 2003

(65) Prior Publication Data

US 2004/0175470 A1 Sep. 9, 2004

(51) Int. Cl.
*A23L 1/314* (2006.01)
*A23L 1/318* (2006.01)

(52) U.S. Cl. ...................... 426/281; 426/319; 426/332; 426/335; 426/519; 426/524; 426/641

(58) Field of Classification Search ................ 426/281, 426/319, 332, 335, 519, 524, 641
See application file for complete search history.

(56) References Cited

U.S. PATENT DOCUMENTS 3,023,109 A 2/1962 Hines
4,220,669 A 9/1980 Townsend
4,292,889 A 10/1981 Townsend
5,012,728 A 5/1991 Langen et al.
5,489,443 A 2/1996 Knipe et al.
5,638,744 A 6/1997 Smith
5,664,488 A 9/1997 Smith
5,773,060 A 6/1998 Smith
5,871,795 A 2/1999 Roth
6,142,067 A 11/2000 Roth
6,387,426 B1 5/2002 Roth
6,389,838 B1 5/2002 Roth
6,565,904 B1 5/2003 Roth

FOREIGN PATENT DOCUMENTS

JP 58047429 A 3/1983
JP 64-39965 2/1989
JP 03004737 A 1/1991
SU 2081186/13 9/1976

*Primary Examiner*—Arthur L. Corbin
(74) *Attorney, Agent, or Firm*—Russell D. Culbertson; The Culbertson Group, P.C.

(57) ABSTRACT

A method for injecting or forcing an ammonia-based pH modifying material into the interior of a meat product to raise the pH at one or more points within the interior of the meat product preferably to a pH above approximately 6.0. The ammonia-based pH modifying material may comprise aqueous ammonia (ammonium hydroxide solution) or a gas including some ammonia gas fraction. The temperature of the meat product may be controlled to a temperature near or just below the initial freezing temperature of the meat product during the time that the pH modifying material is injected. pH decreasing materials may be injected into the interior of the meat product either before or after injection the ammonia-based pH modifying material.

28 Claims, 2 Drawing Sheets

METHOD FOR MODIFYING PH WITHIN MEAT PRODUCTS

TECHNICAL FIELD OF THE INVENTION

This invention relates to meat processing systems in which fluids are injected into meat products. More particularly, the invention relates to methods for injecting pH modifying materials into meat products.

BACKGROUND OF THE INVENTION

Meat processing operations include a wide variety of processing steps for preparing meat products for consumers. After slaughter, the animal carcass is cleaned, chilled, and then passed on to trimming operations in which large cuts of meat such as steaks, roasts, and filets are separated from the carcass. Special processing steps may be applied to the material left after the initial trimming operations to recover additional lean meat from the trimmings.

It may be desirable in some meat processing operations to effect a change in the pH of the meat products by adding appropriate pH modifying processing aids. For example, U.S. Pat. No. 5,871,795 discloses a process for modifying the pH of meat products using pH modifying gases, particularly ammonia gas and carbon dioxide gas, for the purpose of reducing microbe counts in the meat products. The pH modification disclosed in this patent is accomplished by placing the pH modifying gas in contact with the surface of the meat product at a pressure above the vapor pressure of the gas at the temperature of the meat product.

The process described in U.S. Pat. No. 5,871,795 may be applied to finely comminuted meat such as ground beef or to more coarsely comminuted meat such as steaks, roasts, or filets. U.S. Pat. Nos. 6,387,426 and 6,142,067 both disclose other processes for applying a pH increasing materials to meat. The process disclosed in U.S. Pat. No. 6,387,426 is suited particularly for treating larger cuts of meat, while the process disclosed in U.S. Pat. No. 6,142,067 is suited only for treating finely comminuted meat such as ground beef.

The prior pH treatments described in U.S. Pat. Nos. 5,871,795, 6,142,067, and 6,387,426 apply the pH modifying agent at the surface of the material being treated. For example, the treatments disclosed in U.S. Pat. Nos. 5,871,795 and 6,142,067 for finely comminuted or ground meat products apply the pH modifying material to the surface of the individual pieces of comminuted meat. The processes then increase the pressure on the meat product and pH increasing material and/or further comminute the meat product to distribute the pH modifying material. For larger or more coarsely comminuted cuts of meat such as steaks, roasts, or filets, the prior pH modification process shown in U.S. Pat. No. 6,387,426 applies the pH modifying material to the surface of the meat and then drives the pH modifying material into the meat by increasing the pressure on the meat.

The systems and methods set out in the above-described patents are effective for modifying the pH at the surface of the meat product and somewhat below the surface. Surface pH modification was emphasized because microbes are generally only present at the surface of the meat, and the purpose of the pH modification was mostly to reduce microbe counts. The prior pH modifying systems were generally not as effective at modifying the pH of the meat product beyond a thin surface layer on each respective piece of meat. Thus, the interior areas of larger cuts of meat such as steaks, roasts, filets, and larger carcass portions remain generally unaffected by the prior art pH treatments.

SUMMARY OF THE INVENTION

The present invention encompasses methods for injecting or forcing an ammonia-based pH modifying material into the interior of a meat product. Adding the ammonia-based pH modifying material into the interior of the meat product preferably raises the pH at one or more points within the interior of the meat product to a pH above approximately 6.0. As used in this disclosure in the accompanying claims, an ammonia-based pH modifying material may be any material that, when added to a meat product, results in an ammonium hydroxide solution in the meat product. One preferred ammonia-based pH modifying material comprises aqueous ammonia (ammonium hydroxide solution). In the case of ammonium hydroxide solution, the desired solution is produced within the interior of the meat product directly as the ammonia-based pH modifying material is added. Another preferred ammonia-based pH modifying material comprises a gas including some ammonia gas fraction. In the case of ammonia gas, the desired ammonium hydroxide solution is produced in the meat product as the ammonia gas goes into solution in moisture associated with the meat product.

In some forms of the invention, a buffering material may be injected into the interior of the meat product either before, during, or after injecting the ammonia-based pH modifying material. Such a buffering material may be particularly useful when the pH modifying material comprises ammonia gas or a concentrated ammonium hydroxide solution.

A meat product treatment method according to the invention preferably includes inserting an injection conduit or needle into a meat product so that an opening or other fluid communication structure associated with the injection conduit is positioned within the interior of the meat product. Once the injection conduit is properly positioned within the interior of the meat product, the desired ammonia-based pH modifying material may be forced through the injection conduit and into the interior of the meat product through the fluid communication structure. Alternatively to openings such as those in hypodermic needles, the fluid communication structure associated with the injection conduit may include one or more sections of porous and permeable material through which the desired ammonia-based pH modifying material may flow in response to a suitable driving pressure.

Once the ammonia-based pH modifying material is injected into the interior of the meat product, the meat product may be physically manipulated to help distribute the pH modifying material within the meat product. This manipulation may comprise increasing the pressure on the surfaces of the meat product or tumbling or massaging the meat product in a suitable device. The insertion and removal of the injection conduits also provide some manipulation to the meat product.

In addition to injecting the ammonia-based pH modifying material into the interior of a meat product, forms of the invention may also include the step of injecting a suitable pH decreasing material into the interior of the meat product. This pH decreasing material may be injected through the same injection conduit used to inject the ammonia-based pH modifying material, or may be injected through a separate fluid injection device comprising an additional injection conduit and fluid communication structure associated with the additional injection conduit. Regardless of the manner in which the pH decreasing material is injected, the preferred pH decreasing material includes carbon dioxide gas or a solution of carbon dioxide gas dissolved in water (carbonic acid solution). Also, it should be noted that in forms of the invention in which pH increasing and pH decreasing materials are to be injected, either material may be injected first followed by the remaining material. The pH increasing and pH decreasing materials may also be injected simultaneously through separate injection conduits.

One preferred form of the invention includes controlling the temperature of the meat product during the step of forcing or injecting the ammonia-based pH modifying material into the interior of the meat product. In particular, the invention includes maintaining the temperature of the meat product during injection at a temperature just above or perhaps even below the initial freezing temperature of the meat product, that is the temperature at which ice crystals begin to form in the meat product. The method may further include using an ammonium hydroxide solution as the ammonia-based pH modifying material and maintaining the temperature of the solution just above or even at or below the initial freezing temperature of the meat product during the step of forcing or injecting the material into the interior of the meat product. This temperature control of the meat product and the ammonia-based pH modifying material at the time of the injection increases the ability of the meat to hold the pH modifying material. Temperatures below the initial freezing temperature of the meat also allow the pH modifying material to be held in the meat product without immediately going into solution in the moisture within the meat product. Rather, the ice crystals in the meat product and injected pH modifying material may remain in the meat product until the temperature of the meat product is increased to the temperature at which the ice crystals melt. Only at this time does the pH modifying material combine with the previously solidified water in the meat product to increase the pH within the interior of the meat product.

A treatment system embodying the principles of the invention may include a temperature control arrangement to provide the preferred temperature control of the meat product and the pH modifying material being injected into the meat product. The temperature control arrangement may include a prechilling device to refrigerate the meat products to the desired temperature before entering the injection device. A post-injection chilling device may also be included in the treatment system for controlling the temperature of the meat product after the desired injection. In some forms of the invention the post-injection chilling device may be operated to reduce the temperature of the meat product further below the initial freezing temperature of the meat product after the step of forcing the ammonia-based pH modifying material into the interior of the meat product.

The present invention effects a pH change within the interior of the meat product being treated. This pH change in the interior of the meat product may be performed without affecting the pH at the surface of the meat product. However, if a pH modification is desired at the surface of the meat product, additional processes such as those described in U.S. Pat. Nos. 5,871,795 or 6,387,426 may be used in addition to the treatment according to the present invention.

These and other advantages and features of the invention will be apparent from the following description of the preferred embodiments, considered along with the accompanying drawings.

DESCRIPTION OF PREFERRED EMBODIMENTS

Figure 1:
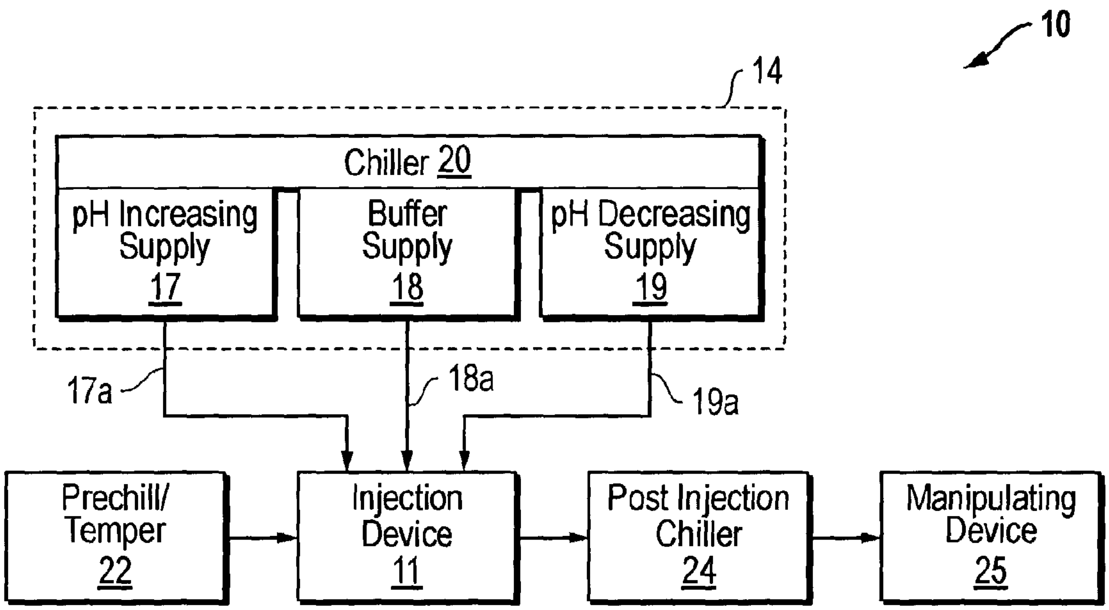
FIG. 1 is a diagrammatic representation of a treatment system for injecting ammonia-based pH increasing materials into the interior of a meat product according to the present invention.
Figure 2:
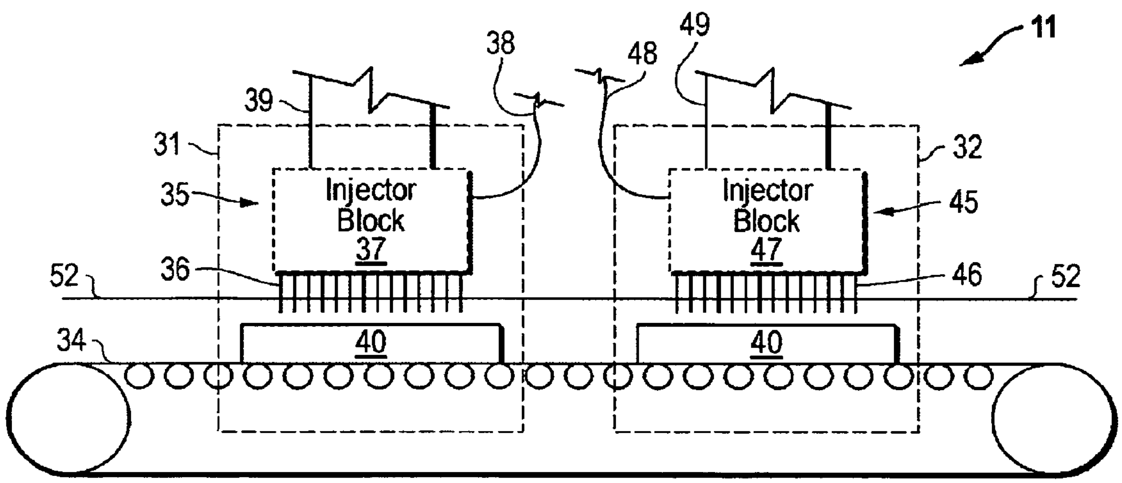
FIG. 2 is a diagrammatic representation of an injection apparatus that may be used to perform methods embodying the principles of the invention.
Figure 3:
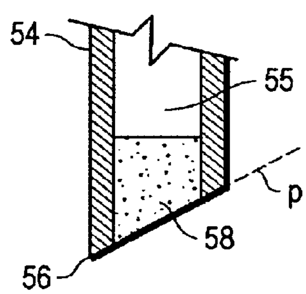
FIG. 3 is an enlarged section view showing an end portion-of an injection conduit that may be used in the apparatus shown in FIG. 2.
Figure 4:
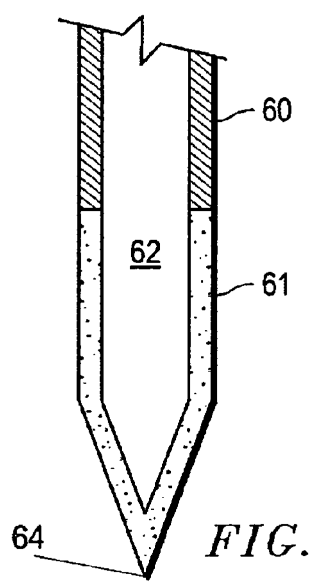
FIG. 4 is a section view similar to FIG. 3, but showing an alternate injection conduit structure.

The system 10 shown diagrammatically in FIG. 1 may be used to describe treatment methods embodying the principles of the present invention. FIG. 2 shows further details of an injection device 11 that may be used in performing certain steps of the invention, while FIGS. 3 and 4 show alternate injection conduits or needles that may be used in the present treatment methods.

Referring to FIG. 1, treatment system 10 includes injection device 11 connected to receive treatment materials from a treatment material supply arrangement 14. The illustrated treatment material supply arrangement 14 in FIG. 1 includes three separate material supplies, a supply 17 of pH increasing material, a supply 18 of buffer material, and a supply 19 of pH decreasing material. Treatment system 10 also includes one or more chilling or temperature control devices that together make up a temperature control arrangement for the meat product being treated in the system. The diagrammatic example system 10 shown in FIG. 1 includes two separate devices that make up the temperature control arrangement, a prechilling device 22 and post-injection chiller 24. Treatment system 10 further includes a manipulating device 25 positioned to receive meat products after the desired injection of treatment materials.

Injection device 11 operates to inject the desired treatment material or materials into the interior of a meat product held in the device. The injection will commonly require inserting an injection conduit or needle into the interior of the meat product to an inserted position. In this inserted position a fluid communication structure or opening in the injection conduit is positioned within the interior of the meat product so that the desired treatment material may be forced through the conduit and into the interior of the meat product. Further detail regarding injection device 11 will be described below with reference to FIGS. 2 and 3.

Each of the material supplies 17, 18, and 19 may include a suitable vessel for containing a supply of the desired material. For example, pH increasing material supply 17 may include a vessel containing ammonia gas or aqueous ammonium (ammonium hydroxide solution). To facilitate some forms of the invention, two separate vessels may be used for pH increasing material supply 17, each separate vessel storing a different pH increasing material. In any event, pH increasing material supply 17 is connected to injection device 11 with at least one suitable connection line or conduit **17*a* to supply the desired material or materials to the injection device to be injected into the meat being treated in the system. It will be appreciated that the material to be injected must be forced into the meat being treated. The pH increasing material may be pressurized to provide the required injection force at supply 17, at injection device 11, or by a suitable device connected between supply 17 and injection device 11**.

pH decreasing material supply 19 may include a vessel suitable for containing a pH deceasing material such as carbon dioxide gas or carbon dioxide in solution with water (carbonic acid solution). As with pH increasing material supply 17, the supply 19 may in fact include more than one vessel with each vessel containing a different pH decreasing material. Regardless of the number of vessels which make up supply 19, the supply is connected by one or more suitable conduits or lines 19*a* to supply the material or materials to injection device 11. The driving force for forcing the pH decreasing material or materials into the meat product being treated may be provided in any of the ways described above with reference to the pH increasing material supply 17.

Buffer material supply 18 may include a vessel or multiple vessels containing water, dilute ammonium hydroxide solution, or any other material that may be used with the pH increasing or decreasing materials according to the present invention. At least one suitable connection conduit or line 18*a* connects buffer material supply 18 to injection device 11. As with the other material supplies 17 and 19, the force for driving the buffer material into the meat product may be provided from the supply itself, at the injection device 11, or using a suitable pumping device connected in the supply line 18*a* extending from supply 18 to injection device 11.

It will be appreciated that although three separate connection lines are shown in FIG. 1 from supplies 17, 18, and 19, some forms of the invention may include a manifold capable of switching between the different supplies. Such a manifold would receive inputs from each material supply and include a suitable arrangement of valves for switching between these inputs and provide an output directed to injection device 11. The present invention is not limited by any particular structural arrangement for supplying the desired pH modifying materials to injection device 11 for injection into the meat products being treated.

Although the supplies 17, 18, and 19 are described above as including one or more vessels containing the desired material, a system for providing the treatment according to the invention may eliminate supply vessels. In these systems any solutions or mixtures to be injected into the meat products may be produced continuously as the material is directed to injection device 11. For example, ammonia may be sparged into a stream of water to produce an ammonium hydroxide pH increasing solution. Carbon dioxide gas may be sparged into a stream of water to produce a carbonic acid pH decreasing solution. These supply arrangements are to be considered equivalent to the supply arrangements including holding vessels for holding supplies of the desired materials to be injected.

Injection fluid temperature control device 20 shown in FIG. 1 operates to control the temperature of the treatment material injected into the meat products through injection device 11. The nature of temperature control device 20 will depend upon the nature of the material being injected. In some forms of the treatment system, temperature control device 20 may comprise a chiller through which the different materials from supplies 17, 18, and/or 19 may be circulated to maintain the materials at the desired temperatures. Temperature control device 20 may comprise a single chilling device for chilling materials from each of the supplies 17, 18, and 19, or separate chilling devices for each supply.

Prechiller device 22 shown in FIG. 1, operates to place the meat products at the desired process temperatures required in the treatment methods according to the present invention. The single device shown as prechiller 22 may actually include a number of separate refrigerating devices. For example, a prechiller may include a freezer for reducing the temperature of the meat products to a temperature well below the initial and final freezing temperature of the meat products, and then one or more separate tempering devices for tempering the meat product to a temperature at or just above or below the initial freezing temperature of the meat product. Alternatively, a single prechilling device 22 may place the meat products at the desired temperature for performing the material injection or injections according to the present invention.

Post-injection chiller 24 may be included in treatment system 10 for controlling the temperature of the meat products after injection with the desired materials in injection device 11. Post-injection chiller 24 may be placed before any manipulating device included in the system such as manipulating device 25 as shown, or after the manipulating device in the process flow. In any case, post-injection chiller 24 may include any suitable refrigerating device for controlling the temperature of the injected meat products within the desired temperature range. This range may include temperatures well below the initial and final freezing temperature of the meat being treated.

Manipulating device 25 is arranged to receive meat products after they have been injected with the desired materials in injection device 11. The device may include a massaging device or tumbler for physically working with the meat products to help distribute the pH increasing and other injected materials throughout the interior of the meat products. Manipulating device 25 may alternatively include a chamber in which the injected the products are placed and subjected to elevated pressures. It will be appreciated that in systems 10 in which the meat is frozen when it leaves injection device 11, manipulation of the meat product may be undesirable in some situations, and thus the manipulating device may be omitted from the system. However, some manipulation in the meat product may be desirable even if the meat product is in a frozen or partially frozen state.

Referring now to FIG. 2, a suitable injection device 11 may include two separate injection stations shown at dashed boxes 31 and 32, and a conveyor 34 for conveying meat products through the device. First injection station 31 includes a first injector 35 having a number of injection conduits or needles 36 extending from a common injector block 37 which is connected to a treatment material supply line 38. It will be appreciated that injector block 37 includes fluid passages that direct treatment fluid from the supply line 38 to the injection conduits 36. Injector block 37 is mounted on a manipulating structure 39 that may be operated to move the block 37 from an upper position shown in solid lines to a lower or injection position shown in phantom lines, and then back to the upper position. In the injection position of block 37, injection conduits 36 are pressed into the meat product 40 to the inserted position in which the desired treatment material may be injected into the interior of the meat product.

Second injection station 32 includes a second injector 45 having injection conduits or needles 46 depending from a injector block 47. A second supply line 48 connects to block 47 for supplying treatment material to the block to be distributed through fluid passages in the block to injection conduits 46. As with the first injector 35, second injector 45 is connected to a manipulating structure 49 which may be operated to move block 47 and injection conduits 46 between an upper position shown in solid lines and a lower, injection position shown in phantom lines. In the injection position, injection conduits 46 are pressed into the meat product 40 to an inserted position in which the desired treatment material may be injected through the injection conduits into the interior of meat product.

Both sets of injection conduits or needles 36 and 46 extend through openings in a plate 52. Plate 52 defines an upper boundary for the path the meat products 40 take through injection device 11. This upper boundary separates the meat products 40 from the upper components of injection device 11. The upper boundary provided by plate 52 also helps define an area or tunnel in the injection device 11 that helps isolate the meat products being treated so as to help maintain the temperature of the meat products as they pass through injection device 11.

In operation, the meat product 40 to be treated is first conveyed to first station 31 and to a position immediately beneath injection conduits 36 carried by injector block 37. Meat product 40 is held in this position while injector block 37 and injection conduits 36 are lowered on manipulating structure 39 until the injection conduits 36 reach an inserted position in which the distal ends of conduits 36 extend into the interior of meat product 40. In this inserted position, an opening or fluid communication arrangement associated with each injection conduit 36 is positioned in the interior of meat product 40. Treatment material may then be pumped or otherwise forced through supply line 38, fluid passages in block 37, and the injection conduits 36 into the interior of meat product 40. After the desired amount of treatment material has been forced into the interior of meat product 40, the flow of treatment fluid through injection conduits 36 may be stopped and manipulating structure 39 operated to lift block 37 up to withdraw the injection conduits from meat product 40. With injection conduits 36 withdrawn from meat product 40, conveyor 34 may be driven with a suitable drive (not shown) to move the meat product to second station 32. Injector 45 at second station 32 may be operated similarly to injector 35 to inject additional treatment fluid into meat product 40. Once any second or additional injection is complete, meat product 40 may then be conveyed out of injection device 11.

It will be appreciated that the injection conduits 36 and 46 may not be maintained in a static inserted position in the meat product 40 while material is injected. Some injection conduits, especially those that inject only through an end of the conduit, may be manipulated to different inserted positions in the meat product by the respective manipulating structure in order to allow the pH modifying material to be injected at different depths in meat product 40.

The supply conduits 38 and 48 to the two injectors 35 and 45, respectively, may each be connected to a respective single supply of treatment material. For example, the first injector 35 may be used to inject an ammonia-based pH modifying material such as aqueous ammonia or a gas mixture including ammonia gas. Second injector 45 may be used to inject a pH deceasing material such as carbon dioxide gas or carbonic acid solution. Alternatively to the fixed supply arrangement, each supply conduit 38 and 48 may be connected to a number of supplies for different types of treatment materials controlled through a suitable manifold (not shown). This multiple supply connection allows for example, a buffer material such as water to be injected first into a meat product and then an ammonia-based pH modifying material such as ammonia gas through the same injection conduits. As yet another alternative, a buffer material may be injected through first injector 35 and an ammonia-based pH modifying material such as ammonia gas may be injected through second injector 45 or even a third or further subsequent injector (not shown in FIG. 2).

FIG. 3 provides an enlarged section view of a distal end of a preferred structure for injection conduits 36 and 46 shown in FIG. 2. The injection conduit includes a tube portion 54 having an opening 55 extending there through. The tube 54 terminates at an end defined by a plane P extending at a steep angle to the longitudinal axis of the tube. This structure provides a sharp pointed end 56 to the injection conduit. Although the end of tube 54 may simply be left open to provide a fluid communication arrangement for allowing treatment fluid to flow through the injection conduit, the illustrated injection conduit includes a plug of porous and permeable material 58 positioned in tube opening 55 at the end of the tube 54. This porous and permeable material is cut along the same plane P as the tube, and facilitates better control of fluid flow through tube opening 55 into the meat product. Examples of suitable porous and permeable materials include sintered metals such as the sintered materials produced by Mott Corporation of Farmington Conn.

FIG. 4 shows an alternate injection conduit that may be used in the present invention. In this alternate structure, the injection conduit includes a base tube portion 60 and an injection tube portion 61. At least a portion of the injection tube portion 61 is made up of porous and permeable material such as the material shown at 58 in FIG. 3. The material to be injected flows from the interior 62 of injection tube portion 61 through the porous and permeable material of fluid communication structure. This alternative injection conduit and fluid communication structure has the advantage that the pH modifying material flows into the meat all along the porous and permeable material, which, as shown in FIG. 4, may extend far up the side of the conduit. This ability of the pH modifying material to flow into the meat through essentially the sides of the injection conduit allows the material to be injected at different depths in the meat without having to adjust the depth to which the conduit is inserted into the meat.

The injection conduit structure shown in FIG. 4 includes a conical pointed end 64 to facilitate inserting the conduit into the meat product to be treated. This type of pointed end is shown only for purposes of example. Alternate forms of injection conduits having porous and permeable side sections may be formed with a steeply angled planar end similar to the planar end of the conduit shown in FIG. 3. Also, other forms of the injection conduit may include a solid material tip or point and porous and permeable material along the sides of the conduit or portions of the conduit.

The preferred methods of treating meat products may be described with reference to the apparatus shown in FIGS. 1 through 3. One preferred treatment method includes inserting the injection conduits 36 or 46 shown in FIG. 2 into meat product 40 to the inserted position described above. The method then includes forcing an ammonia-based pH modifying material through the injection conduits 36 or 46 into the interior of meat product 40. Sufficient ammonia-based pH modifying material is preferably forced into the interior of meat product 40 to increase the pH at one or more points within the interior of the meat product to a pH of approximately 6.0 and perhaps to as high as 7.5 or higher.

It will be appreciated that the amount of pH modifying material required to produce the desired final pH in the meat product will depend upon a number of factors including the concentration of the pH modifying material, the initial pH of the meat product, and the temperature of the meat product. Ammonium hydroxide solutions having a pH from 8.0 to 12.0 may be used to produce the desired pH change in the meat. Where the pH modifying material includes ammonia gas, ammonia gas may be used in substantially pure form or may be mixed with other gasses such as nitrogen, helium, argon, or carbon dioxide gas.

After or before injecting the ammonia-based pH modifying material into the interior of meat product 40, the present invention may also include the step of forcing a pH decreasing material into the interior of the meat product. This pH decreasing material, such as carbon dioxide gas or carbon dioxide in solution with water, may be injected through the same injection conduits 36 used to inject the ammonia-based pH modifying material. Alternatively, the treatment method may include inserting the second injection conduits 46 into the meat product 40 to the inserted position. The step of forcing the pH decreasing material into the interior of the meat product may then be accomplished through this second set of injection conduits or needles 46.

After the step of injecting the ammonia-based pH modifying material or the pH decreasing material, or after each injection step, the invention may include physically manipulating the meat product 40 to distribute the injected materials within the meat product. This physical manipulation may be through any suitable manipulating device (25 in FIG. 1), such as a massaging or tumbling device, or a pressurizing device.

An important aspect of the present invention relates to the temperature of meat product 40 at the time of injecting the treatment material, and especially the ammonia-based pH modifying material. In a preferred form of the invention, the temperature of the meat product 40 in FIG. 2 is controlled to temperature just above, or at or just below, the initial freezing temperature of the meat product and maintained at this temperature during the step of forcing the ammonia-based pH modifying material into the interior of the meat product. For example, meat products may be maintained at a temperature of no greater than about 35 degrees Fahrenheit during the pH modifying material injection.

Where the ammonia-based pH modifying material comprises ammonium hydroxide solution, the invention may further include the step of maintaining the temperature of the ammonium hydroxide solution at or below the initial freezing temperature of meat product 40 during the step of forcing the material into the interior of the product. The meat product temperature may also be reduced further after forcing the ammonia-based pH modifying material into the interior of meat product 40.

Controlling the temperature of meat product 40 to a temperature just above the initial freezing point of the meat product allows the meat to more readily take or absorb the pH modifying material. Controlling the temperature of the meat product 40 to a temperature at or below the initial freezing temperature of the meat product during the injection step allows the pH modifying material to be injected without immediately going into solution in the moisture contained in the meat product. Rather, the injected pH modifying material remains unabsorbed in meat product 40 while the product remains frozen, and goes into solution in the original moisture in the meat product only after the temperature of the meat product is raised to a temperature above the freezing point of the meat. Alternatively, the pH modifying material may be injected while the meat temperature is above the initial freezing temperature and then the temperature of meat product 40 may be reduced quickly during the pH modifying material injection step or immediately thereafter to freeze the meat product and arrest the distribution of pH modifying material into the moisture of the meat product. The pH modifying material may then continue to distribute through the meat product only after the temperature of the meat product is increased above the freezing point.

Ammonia gas or aqueous ammonia comprise the preferred ammonia-based pH modifying materials. Where ammonia gas is used as a pH modifying material, it may be necessary or desirable to dilute the gas with other gasses in order to prevent the meat from being over treated. Alternatively or in addition to diluting the ammonia gas concentration in the treatment material, a method according to the invention may include injecting a buffering material into the interior of any product prior to forcing the ammonia gas intending interior of any product. A suitable buffering material may comprise water, dilute ammonium hydroxide solutions (having a pH below about 8.0), or perhaps carbon dioxide gas or dilute carbonic acid solutions, or any other material suitable for buffering the pH increasing material in the meat product and tying up ammonia that does not become tied up in the meat upon injection. Buffering with these materials may also be useful or required when using a highly concentrated solution of ammonium hydroxide as the pH increasing material. Buffering material may also be sprayed onto the surface of the meat product before, during, or after injecting with pH modifying material to help absorb or neutralize excess pH modifying material.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. A method for treating meat products, the method including the steps of:

(a) inserting an injection conduit into a meat product so that a fluid communication structure of the injection conduit is positioned within an interior of the meat product; and (b) forcing an ammonia-based pH modifying material through the injection conduit and the fluid communication structure into the interior of the meat product.

2. The method of claim 1 wherein the step of forcing the ammonia-based pH modifying material into the interior of the meat product increases the pH at one or more points within the interior of the meat product to a pH above approximately 6.0.

3. The method of claim 1 further including the step of physically manipulating the meat product to distribute the ammonia-based pH modifying material within the meat product.

4. The method of claim 1 further including the step of forcing a pH decreasing material into the interior of the meat product.

5. The method of claim 4 wherein the pH decreasing material is forced into the interior of the meat product through the injection conduit and fluid communication structure associated therewith.

6. The method of claim 4 further including the step of inserting a second injection conduit into the meat product so that a fluid communication structure of the second injection conduit is positioned within the interior of the meat product, and wherein the pH decreasing material is forced into the interior of the meat product through the second injection conduit and fluid communication structure associated therewith.

7. The method of claim 4 further including the step of physically manipulating the meat product to distribute the pH decreasing material within the meat product.

8. The method of claim 1 wherein the step of forcing the ammonia-based pH modifying material into the interior of the meat product is performed while the temperature of the meat product is at a temperature at or below the initial freezing temperature of the meat product.

9. The method of claim 8 wherein the ammonia-based pH modifying material includes ammonium hydroxide solution and further including the step of maintaining the temperature of the ammonium hydroxide solution at or below the initial freezing temperature of the meat product during the step of forcing the ammonia-based pH modifying material into the interior of the meat product.

10. The method of claim 9 further including the step of reducing the temperature of the meat product further after forcing the ammonia-based pH modifying material into the interior of the meat product.

11. The method of claim 1 further including the step of controlling the temperature of the pH modifying material to a temperature at or below the initial freezing temperature of the meat product during the step of forcing the ammonia-based pH modifying material into the interior of the meat product.

12. The method of claim 1 further including the step of maintaining the temperature of the meat product at a temperature above the initial freezing temperature of the meat product during the step of forcing the ammonia-based pH modifying material into the interior of the meat product and then reducing the temperature of the meat product to a temperature below the initial freezing temperature of the meat product after forcing the ammonia-based pH modifying material into the interior of the meat product.

13. The method of claim 1 further including the step of injecting a buffering material into the interior of the meat product before or after forcing the ammonia-based pH modifying material into the interior of the meat product.

14. The method of claim 13 wherein the buffering material includes water or ammonium hydroxide solution.

15. The method of claim 1 wherein the step of forcing the ammonia-based pH modifying material into the interior of the meat product is performed while the temperature of the meat product is at a temperature of approximately 35 degrees Fahrenheit or below.

16. A method for treating meat products, the method including the steps of:

(a) controlling the temperature of a meat product so that ice crystals are present in the interior of the meat product; and (a) injecting an ammonia-based pH increasing material into the interior of the meat product while ice crystals are present in the interior of the meat product.

17. The method of claim 16 wherein the ammonia-based pH modifying material includes ammonium hydroxide solution and further including the step of maintaining the temperature of the ammonium hydroxide solution at or below the initial freezing temperature of the meat product during the step of injecting the ammonia-based pH modifying material into the interior of the meat product.

18. The method of claim 16 further including the step of reducing the temperature of the meat product further after injecting the ammonia-based pH modifying material into the interior of the meat product.

19. The method of claim 16 further including the step of adding a buffering material to the interior of the meat product before or after to injecting the ammonia-based pH modifying material into the interior of the meat product.

20. The method of claim 19 wherein the buffering material includes water.

21. A method for treating a meat product, the method including the steps of:

(a) forcing a first pH modifying material into the meat product from within the interior of the meat product, the first pH modifying material effecting a first change in the pH within the interior of the meat product; and (b) after the step of forcing the first pH modifying material into the meat product, forcing a second pH modifying material into the meat product from within the interior of the meat product, the second pH modifying material effecting a second change in the pH within the interior of the meat product, the second change being opposite to the first change in the pH.

22. The method of claim 21 wherein the first pH modifying material is a pH increasing material and the second pH modifying material is a pH decreasing material.

23. The method of claim 22 wherein the first pH modifying material comprises ammonia gas or ammonium hydroxide solution and wherein the second pH modifying material comprises carbon dioxide gas or carbon dioxide in solution with water.

24. The method of claim 21 wherein the first pH modifying material is a pH decreasing material and the second pH modifying material is a pH increasing material.

25. The method of claim 24 wherein the first pH modifying material comprises carbon dioxide gas or carbon dioxide in solution with water and wherein the second pH modifying material comprises ammonia gas or ammonium hydroxide solution.

26. The method of claim 21 further including the step of controlling the temperature of the meat product to a temperature at or below the initial freezing temperature of the meat product during the step of forcing the first pH modifying material into the interior of the meat product or during the step of forcing the second pH modifying material into the interior of the meat product.

27. The method of claim 21 further including the step of controlling the temperature of the first pH modifying material to a temperature at or below the initial freezing temperature of the meat product during the step of forcing the first pH modifying material into the interior of the meat product or controlling the temperature of the second pH modifying material to a temperature at or below the initial freezing temperature of the meat product during the step of forcing the second pH modifying material into the interior of the meat product.

28. The method of claim 21 further including the step of maintaining the temperature of the meat product at a temperature above the initial freezing temperature of the meat product during the step of forcing the first or second pH modifying material into the interior of the meat product and then reducing the temperature of the meat product to a temperature below the initial freezing temperature of the meat product after forcing the respective pH modifying material into the interior of the meat product.

* * * * *